United States Patent
Lewis et al.

(10) Patent No.: US 7,469,926 B2
(45) Date of Patent: Dec. 30, 2008

(54) ACTIVE VENTING INFLATOR DEVICE

(75) Inventors: Robert E. Lewis, West Haven, UT (US); Gregory J. Lang, South Ogden, UT (US); Mark L. Enders, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 83 days.

(21) Appl. No.: 11/437,543

(22) Filed: May 19, 2006

(65) Prior Publication Data

US 2007/0267855 A1 Nov. 22, 2007

(51) Int. Cl.
*B60R 21/26* (2006.01)
*B60R 21/268* (2006.01)
(52) U.S. Cl. ............... 280/736; 280/742; 280/743.2
(58) Field of Classification Search ............... 280/736, 280/737, 739, 741, 742, 743.2
See application file for complete search history.

(56) References Cited

U.S. PATENT DOCUMENTS

| | | | |
|---|---|---|---|
| 5,249,825 A | 10/1993 | Gordon et al. | |
| 5,630,618 A | 5/1997 | Hamilton et al. | |
| 5,664,802 A | 9/1997 | Harris et al. | |
| 6,276,716 B1 | 8/2001 | Kato | |
| 6,422,597 B1 | 7/2002 | Pinsenschaum et al. | |
| 6,454,300 B1 | 9/2002 | Dunkle et al. | |
| 6,513,835 B2* | 2/2003 | Thomas | 280/743.2 |
| 6,561,545 B2* | 5/2003 | Greib et al. | 280/743.2 |
| 6,616,177 B2 | 9/2003 | Thomas et al. | |
| 6,648,371 B2 | 11/2003 | Vendely et al. | |
| 6,832,778 B2 | 12/2004 | Pinsenschaum et al. | |
| 6,918,614 B2 | 7/2005 | Ryan | |
| 7,155,857 B2* | 1/2007 | Elder | 42/72 |
| 7,246,819 B2* | 7/2007 | Hofmann et al. | 280/739 |
| 2005/0029786 A1 | 2/2005 | Watase et al. | |
| 2005/0121894 A1 | 6/2005 | Brisighella, Jr. et al. | |
| 2005/0212273 A1* | 9/2005 | Thomas et al. | 280/739 |
| 2006/0082113 A1 | 4/2006 | Smith et al. | |

FOREIGN PATENT DOCUMENTS

| | | | |
|---|---|---|---|
| EP | 0 790 157 A2 | | 8/1997 |
| GB | 2415665 A | * | 1/2006 |

* cited by examiner

*Primary Examiner*—Christopher Ellis
*Assistant Examiner*—Joseph Rocca
(74) *Attorney, Agent, or Firm*—Sally J Brown; Pauley Petersen & Erickson

(57) ABSTRACT

An inflator device for inflating an inflatable cushion of an inflatable cushion restraint system. The inflator device includes a supply of gas generant material disposed within a sealed chamber, and an initiator device in reaction initiation combination with the supply of gas generant material. A venting orifice connects the chamber to the surrounding ambient environment, and a rupturable seal seals the venting orifice. Upon reaction initiation of the gas generant material to produce inflation gas, the rupturable seal ruptures to vent the chamber to the ambient environment. A valve assembly can be disposed adjacent the venting orifice. A moveable valve piston, in combination with an actuator device, can block the venting orifice as needed to close the venting orifice and stop inflation gas venting. An optional tether release mechanism can be used in combination with the valve assembly to release a cushion tether upon closing of the venting orifice.

17 Claims, 4 Drawing Sheets

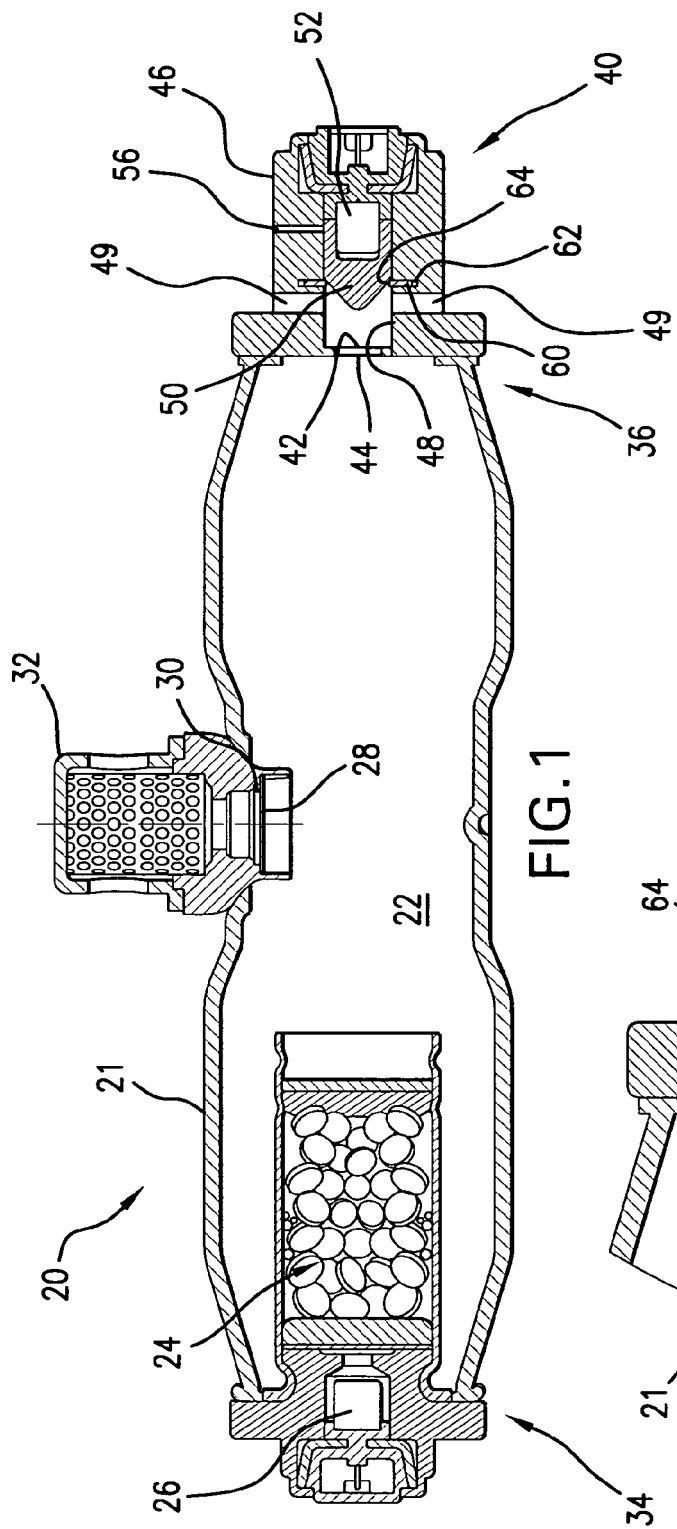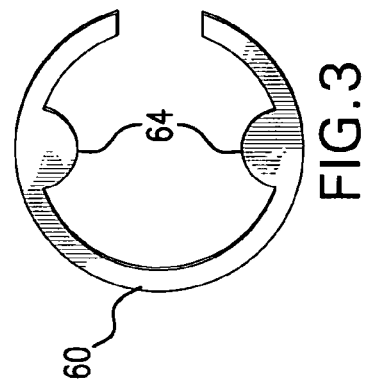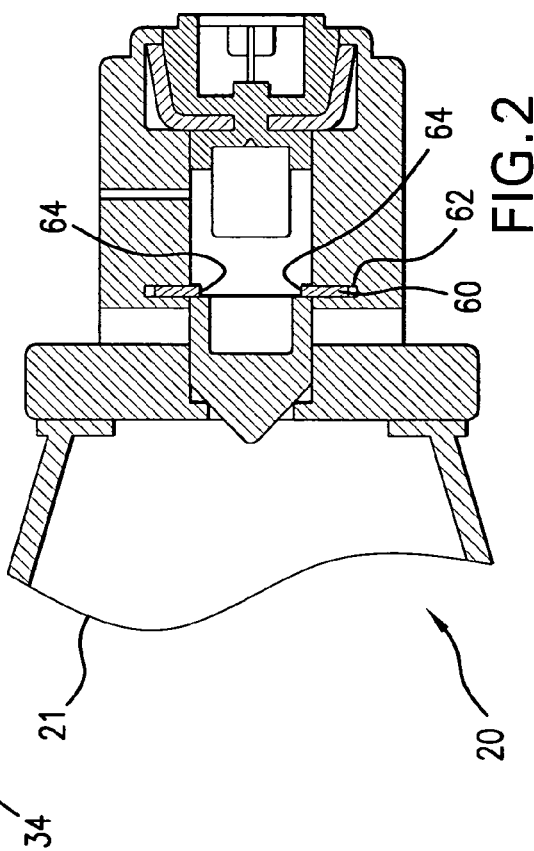

ACTIVE VENTING INFLATOR DEVICE

BACKGROUND OF THE INVENTION

This invention relates generally to the providing or supplying of inflation gas and, more particularly, to the providing or supplying of such inflation gas via an elongated inflator such as may be desired for certain inflatable passive restraint systems for use in vehicles for restraining the movement of an occupant in the event of a vehicular collision.

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior. For example, typical or customary vehicular airbag cushion installation locations have included in the steering wheel, in the dashboard on the passenger side of a car, along the roof line of a vehicle such as above a vehicle door, and in the vehicle seat such as in the case of a seat-mounted airbag cushion. Other airbag cushions such as in the form of knee bolsters and overhead airbags also operate to protect other or particular various parts of the body from collision.

In addition to an airbag cushion, inflatable passive restraint system installations also typically include a gas generator, also commonly referred to as an "inflator." Upon actuation, such an inflator device desirably serves to provide an inflation fluid, typically in the form of a gas, used to inflate an associated airbag cushion. Various types or forms of inflator devices have been disclosed in the art for use in inflating an inflatable restraint system airbag cushion.

One particularly common type or form of inflator device used in inflatable passive restraint systems is commonly referred to as a pyrotechnic inflator. In such inflator devices, gas used in the inflation of an associated inflatable element is derived from the combustion of a pyrotechnic gas generating material.

Another known type of compressed gas inflator is commonly referred to as a "hybrid" inflator. In such an inflator device, inflation gas results from a combination of stored compressed gas and the combustion of a gas generating material, e.g., a pyrotechnic.

In view of possibly varying operating conditions and, in turn, possibly varying desired performance characteristics, there is a need and a desire to provide what has been termed an "adaptive" inflator device and a corresponding inflatable restraint system. With an adaptive inflator device, output parameters such as one or more of the quantity, supply, and rate of supply (e.g., mass flow rate) of inflation gas, for example, can be selectively and appropriately varied dependent on selected operating conditions such as ambient temperature, occupant presence, seat belt usage and rate of deceleration of the motor vehicle, for example.

While such adaptive systems are desirable, they typically require the inclusion of additional components as a part of the associated inflator device and such as may undesirably increase one or more of the size, cost and weight of the inflator device. For example, various proposed or available dual stage inflator devices appear based on the principle of packaging together two separate inflators. As a result, such inflator combinations commonly include two distinct pressure vessels, two sets of filter or inflation gas treatment components, one for the output of each of the pressure vessels, and two distinct diffusers, again one for the output of each of the pressure vessels. Thus, it has been difficult to provide an adaptive inflator which will satisfactorily meet the size, cost and weight limitations associated with modern vehicle design.

Upon actuation of the inflator device, inflation gas fills the inflatable cushion. Control over the size and shape of the inflated cushion can be provided through the use of tethering elements in the form of straps or webs extending between portions of the inflatable cushion and/or the inflatable cushion and the housing containing the inflatable cushion. The desired configuration of the inflated cushion may depend on the severity of the collision. In some instances, a tethered cushion may be desired, but in other instances no tethers may provide better protection. Release systems have been developed for releasing tethers upon one or more sensors determining particular collision parameters. However, such tether release systems generally require additional and relatively complex parts, thereby increasing the cost and difficulty of manufacture and installation of the inflatable cushion restraint system.

There is a need for an efficient and cost-effective adaptive inflator. There is also a need for a simple, efficient and cost-effective tether release system.

SUMMARY OF THE INVENTION

A general object of the invention is to provide an improved inflator device for inflatable cushion restraint system.

A more specific objective of the invention is to overcome one or more of the problems described above.

The general object of the invention can be attained, at least in part, through an improvement to an inflator device for inflating an inflatable cushion of an inflatable cushion restraint system. The inflator device includes a supply of gas generant material disposed within a sealed chamber, and an initiator device in reaction initiation combination with the supply of gas generant material. A venting orifice connects the chamber to an ambient environment and a rupturable seal seals the venting orifice. Upon reaction initiation of the gas generant material, the rupturable seal ruptures to vent the chamber to the ambient environment.

As compared to the venting mechanism of this invention, the prior art generally fails to provide a relatively simple, effective and low cost adaptive inflator device by utilizing an active venting system.

The invention further comprehends an inflator device for inflating an inflatable cushion of an inflatable cushion restraint system. The inflator device includes a housing at least in part defining a chamber. A supply of gas generant material is disposed at least partially within the chamber. An initiator device is in reaction initiation combination with the supply of gas generant material. The housing includes an outlet orifice in inflation combination with the inflatable cushion. The housing further includes a venting orifice connecting the chamber to an ambient environment. A rupturable seal seals each of the outlet orifice and the venting orifice.

The invention still further comprehends an inflator device for inflating an inflatable cushion of an inflatable cushion restraint system. The inflator device includes a housing having a first housing wall and a second housing wall, and at least in part defining a chamber. A supply of gas generant material is disposed at least partially within the chamber. An initiator device is in reaction initiation combination with the supply of gas generant material. The inflator device includes an outlet orifice in the first housing wall and in inflation combination with the inflatable cushion. The inflator device includes a venting orifice in the second housing wall that connects the chamber to an ambient environment. A rupturable seal seals each of the outlet orifice and the venting orifice. A valve assembly is disposed adjacent the venting orifice. The valve assembly includes a valve passageway aligned with the venting orifice, a valve piston that is moveable within the valve passageway, a valve initiator device disposed at an end of the valve passageway opposite the venting, and a valve venting channel. Upon actuation, the valve initiator device produces reaction products that move the valve piston to block the venting orifice. The inflator device includes a tether release mechanism. The tether release mechanism includes a tether release chamber and a tether piston moveable within the tether release chamber. The tether release chamber has a chamber side wall that has an inlet opening in discharge alignment with the valve venting channel of the valve assembly. A piston opening is disposed in a chamber end wall that is adjacent the chamber side wall. The tether piston includes a piston rod extending through the piston opening for retaining a tether connected to the inflatable cushion.

Other objects and advantages will be apparent to those skilled in the art from the following detailed description taken in conjunction with the appended claims and drawings.

BRIEF DESCRIPTION OF THE DRAWINGS

FIG. 1 is a sectional view of an inflator device according to one embodiment of the invention.

FIG. 2 is a sectional view of a portion of the inflator device shown in FIG. 1, showing the valve assembly in a closed position.

FIG. 3 is a plan view of a snap ring according to one embodiment of the invention.

DETAILED DESCRIPTION OF THE INVENTION

Figure 4:
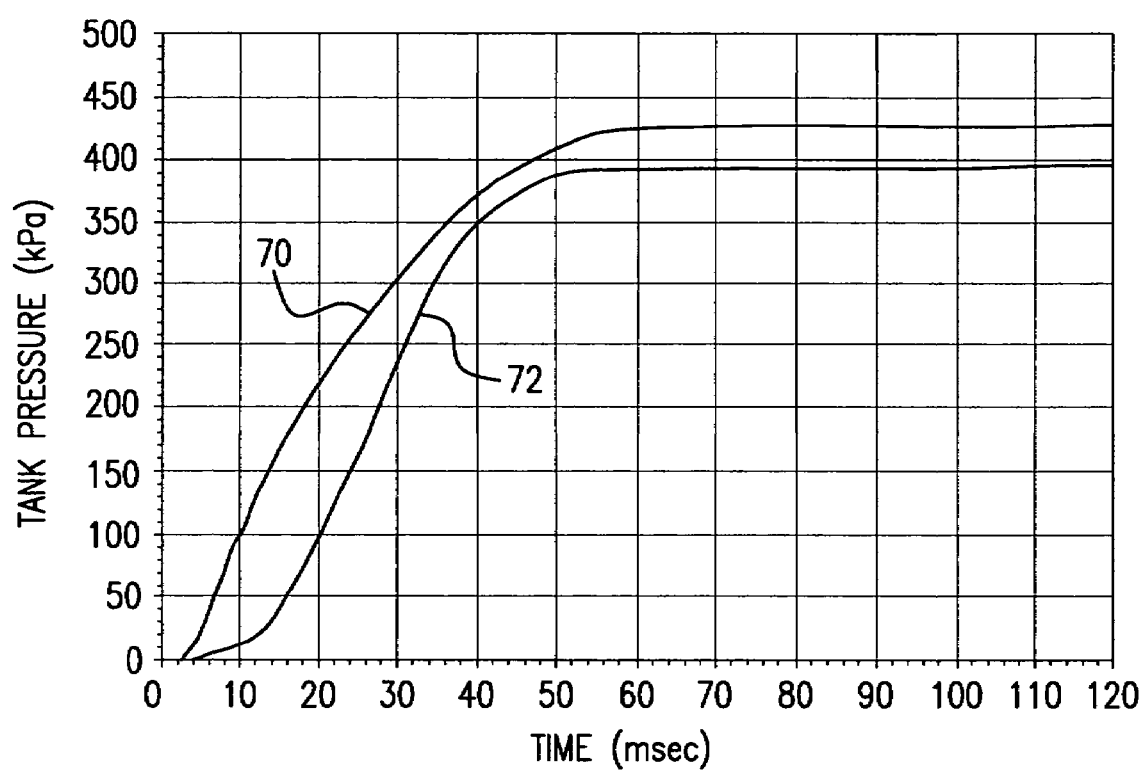
FIG. 4 is a graph of a simulated performance of an inflator device according to one embodiment of the invention.

The present invention provides an active venting system that is an integral part of an inflator device. The venting system of the invention provides control over the volume and pressure of inflation gas discharged into an associated inflatable cushion. In one embodiment of the invention, the venting system of the invention is used in combination with an inflatable cushion tether release mechanism. By the integration of the mechanisms for venting inflation gas and releasing an inflatable cushion tether into the design of the inflator device, a simpler and cost-effective system is obtained.

FIG. 1 is a sectional view of an inflator device 20 according to one embodiment of the invention. The inflator device 20 is a passenger side inflator device particularly useful for inflating an inflatable cushion of an inflatable cushion restraint system. The inflator device 20 includes a cylindrical housing 21 defining, at least in part, a sealed chamber 22. A supply of gas generant material 24 is disposed within the sealed chamber 22. An initiator device 26, as is known and available to those skilled in the art, is disposed in reaction initiation combination with the supply of gas generant material 24. Upon receiving an electrical signal upon or during a collision, the initiator device 26 initiates reaction of the supply of gas generant material 24 to produce at least one reaction product, such as a gas. Inflation gas stored and/or produced within the sealed chamber 22 ruptures a first rupturable seal 28, such as a burst disk, and exits the sealed chamber 22 through an outlet orifice 30 and a diffuser element 32, both disposed at a side wall of the housing 21, and into an associated inflatable cushion (not shown).

In the embodiment shown in FIG. 1, the initiator device 26 is disposed at, and attached to the inflator device 20 at, a first end 34 of the inflator device 20. At a second, opposite end 36 of the inflator device 20, the inflator device 20 includes a valve 40. The valve 40 is in combination with, and disposed over, a venting orifice 42 connecting the chamber 22 to the ambient environment surrounding or external the inflator device 20. A second rupturable seal 44, such as a second burst disk, seals the venting orifice 42 when the inflator device 20 is in an inactive state before activation. Upon reaction initiation of the gas generant material 24, the pressure in chamber 22 increases, rupturing the second rupturable seal 44 to vent inflation gas from the chamber 22 to the ambient environment. The valve 40 is closable to block venting through the venting orifice 42 upon rupture of the second rupturable seal 44.

The valve 40 shown in the embodiment of FIG. 1 includes a valve assembly 46 that is disposed adjacent and/or over the venting orifice 42. The valve assembly 46 includes a valve passageway 48 aligned with the venting orifice 42 and connecting the venting orifice 42 with the ambient environment. A plurality of radial vent passageways 49 radially extend from the valve passageway 48, and connect the valve passageway 48 to the ambient environment. A valve piston 50 is disposed in the valve passageway 48 and moveable therein. A valve actuator device 52 is disposed adjacent the valve piston 50, at an end of the valve passageway 48 opposite the venting orifice 42. The valve actuator device 52 is provided for moving the valve piston 50 within the valve passageway, wherein upon actuation of the valve actuator device 52, the valve piston 50 moves to block venting through the venting orifice 42. In the embodiment of the invention shown in FIG. 1, the valve actuator device 52 is a valve initiator device that is disposed at the end of the valve passageway 48 opposite the venting orifice 42.

The valve assembly 46 includes a ventable pressure release opening 56 connecting the valve passageway 48 to the ambient environment. In an open position before actuation of the valve initiator device 52, as shown in FIG. 1, the valve piston 50 is disposed over or is blocking the pressure release opening 56. Upon actuation of the valve initiator device 52, the valve piston 50 moves within the valve passageway 48, such that the pressure release opening 56 is then disposed between the valve piston 50 and the valve initiator device 52, as shown in FIG. 2, to vent any excess reaction products produced upon actuation of the valve initiator device 52.

The valve assembly 46 additionally includes a piston locking mechanism holding the piston 50 adjacent to the valve initiator device 52 in the open position shown in FIG. 1. Various and alternative configurations are available for the piston locking mechanism. In one embodiment of this invention, the piston locking mechanism includes a snap ring, such as shown in FIG. 3, or one or more pins in combination with a spring. The snap ring or pin is disposed partially within an aperture in a wall of the valve passageway. Referring to FIGS. 1 and 3, portions 64 of the snap ring 60 extend from a circumferential aperture 62, and are disposed adjacent the valve piston 50 to secure the valve piston in an open position adjacent the valve actuator device 52. The snap ring 60 is desirably made of a flexible material, such as spring steel. Upon actuation of the valve initiator device 52, the snap ring 60 expands or opens and moves back into the aperture by the force of the valve piston 50 against the portions 64, thereby allowing the valve piston 50 to move within the valve passageway 48. In one embodiment of the invention, as shown in FIG. 2, the portions 64 of the snap ring 60 extend back into the valve passageway 48 to secure the valve piston 50 in the closed position adjacent and closing or sealing the venting orifice 42.

The inflator device of the invention is an adaptive inflator device, which can provide, through the venting mechanism, either a relatively higher inflation gas output or a relatively lower inflation gas output to an associated inflatable cushion. By venting inflation gas through the venting orifice 42, the inflator performance can be reduced early during activation, as can be desirable for out of position occupants. The open venting orifice vents unnecessary inflation gas below the instrument panel, thereby allowing the inflatable cushion to deploy at a relatively lower rate. Closing the venting orifice directs more inflation gas into the inflatable cushion. Thus, the inflation rate of the cushion can be varied as needed. FIG. 4 shows a graph, with curve 70 representing a simulated inflation gas output of an inflator device with a closed vent, and curve 72 representing a simulated inflation gas output of an inflator device with a vent open for a 15 millisecond duration. As shown by curve 72, the open vent can reduce the inflation rate of the associated inflatable cushion and the maximum inflation gas pressure produced by the inflator device. As will be appreciated by those skilled in the art following the teachings herein provided, the initiator device is connected to a sensor system, known by and available to those skilled in the art, that determines when and if the valve should be closed.

In one embodiment of this invention, a method of using the inflator device of the invention upon a collision includes initiating reaction of the supply of gas generant material to produce inflation gas. The valve actuator is actuated to move the valve piston within the valve passageway. The venting orifice is then blocked with the valve piston to direct most or all of the inflation gas to the inflatable cushion.

Figure 5:
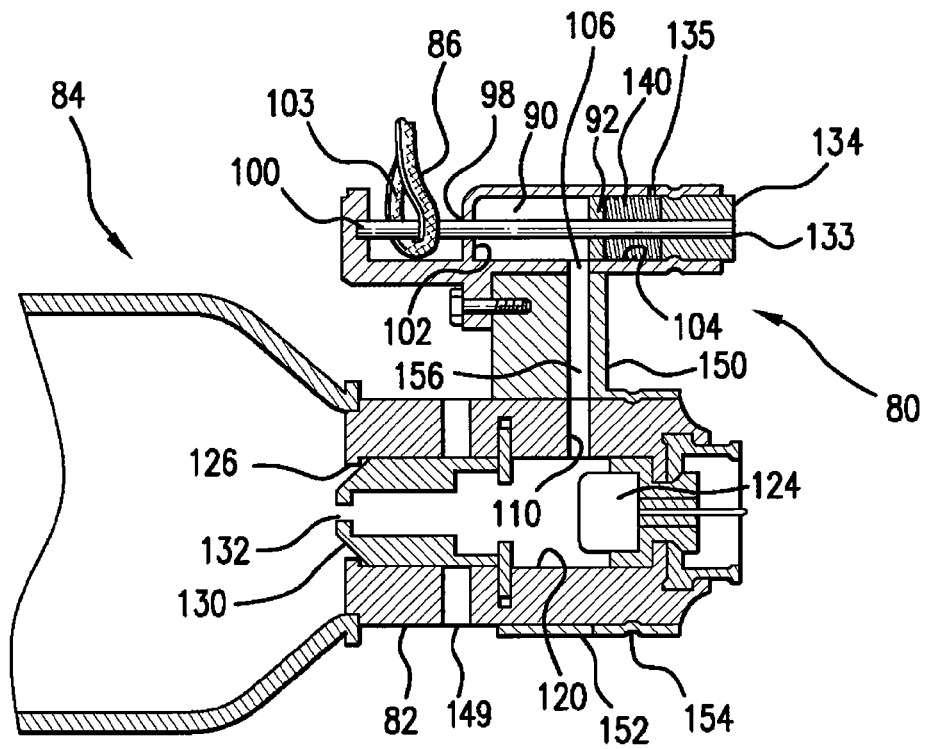
FIG. 5 is a partial and sectional view of an inflator device having a tether release mechanism in combination with a valve assembly, according to another embodiment of the invention.

In one embodiment of this invention, the valve assembly can be used in combination with, and to actuate, a tether release mechanism. FIG. 5 shows an embodiment of such a tether release mechanism 80 in combination with a valve assembly 82 of an inflator device 84. The tether release mechanism 80 secures, and can release, a tether 86, such as is known and available to those skilled in the art, connected to an inflatable cushion (not shown). The inflator device 84 and the valve assembly 82 can be, for example, similar or identical to those illustrated in FIGS. 1-2.

The tether release mechanism 80 includes a cylindrical tether release chamber 90 and a tether piston 92 moveable within the tether release chamber 90. The tether piston 92 includes a piston rod 100 that extends through a piston opening 98 in a first chamber end wall 102. The piston rod 100 retains the tether 86, such as, for example, by the tether 86 having a loop 103 disposed around the piston rod 100. As will be appreciated by those skilled in the art following the teachings herein provided, various sizes, shapes and configurations are available for the tether release chamber, the piston, the piston rod, and the tether.

The tether release chamber 90 includes a chamber side wall 104 adjacent the end wall 102. The chamber side wall 104 includes an inlet opening 106 that is in discharge alignment with a valve venting channel 110 of the valve assembly 82. The valve venting channel of one embodiment of the invention can be, for example, a pressure release opening such as described above in FIGS. 1 and 2. The valve venting channel 110 connects the valve passageway 120 of the valve assembly 82 to the tether release mechanism 80, and more particularly, the tether release chamber 90.

Similar to that described above with reference to FIGS. 1 and 2, the valve actuator device 82 is a valve initiator device 124 disposed at an end of the valve passageway 120 opposite a venting orifice 126 of inflator device 84. The inlet opening 106 is in discharge alignment with the valve venting channel 110, such that upon actuation of the valve initiator device 124, the valve initiator device 124 produces reaction products that move a piston 130 through the valve passageway 120 to block radial vent passageways 149 and expose the valve venting channel 110 to the valve passageway 120. The piston 130 includes an opening 132 therethrough that allows an amount of inflation gas produced by the inflater device 84 to pass through the piston 130 and into the valve venting channel 110, through the inlet opening 106 and ultimately into the tether release chamber 90.

The inflation gas entering the tether release chamber 90 actuates the tether release mechanism 80 by increasing the pressure within the tether release chamber 90. The inflation gas moves the tether piston 92 toward a second chamber end wall 134 that is opposite the first chamber end wall 102. The piston rod 100 moves with the tether piston 92 and slides through the piston opening 98 and out from the loop 103, thereby releasing the tether 86. The end wall 134, shown in FIG. 5 as a separate end cap crimped in place, also includes a piston opening 133 through which the piston rod 100 extends and moves upon actuation. The tether release mechanism 80 can include an optional vent 135 to vent excess inflation gas from the tether release chamber 90, thereby desirably reducing the pressure within the tether release chamber 90, such as once the tether 86 has been released.

In one embodiment of this invention, a compressible member 140 is disposed between the tether piston 92 and the second chamber end wall 134. The compressible member 140 desirably holds the piston 92 and the piston rod 100 in the tether securing position prior to actuation, and is compressible by the piston 92 upon the inflation gas entering the tether release chamber 90. The compressible member 140 can be, for example, a spring member, such as a spring with a relatively low spring constant, or any other suitable compressible member or material.

Figure 6:
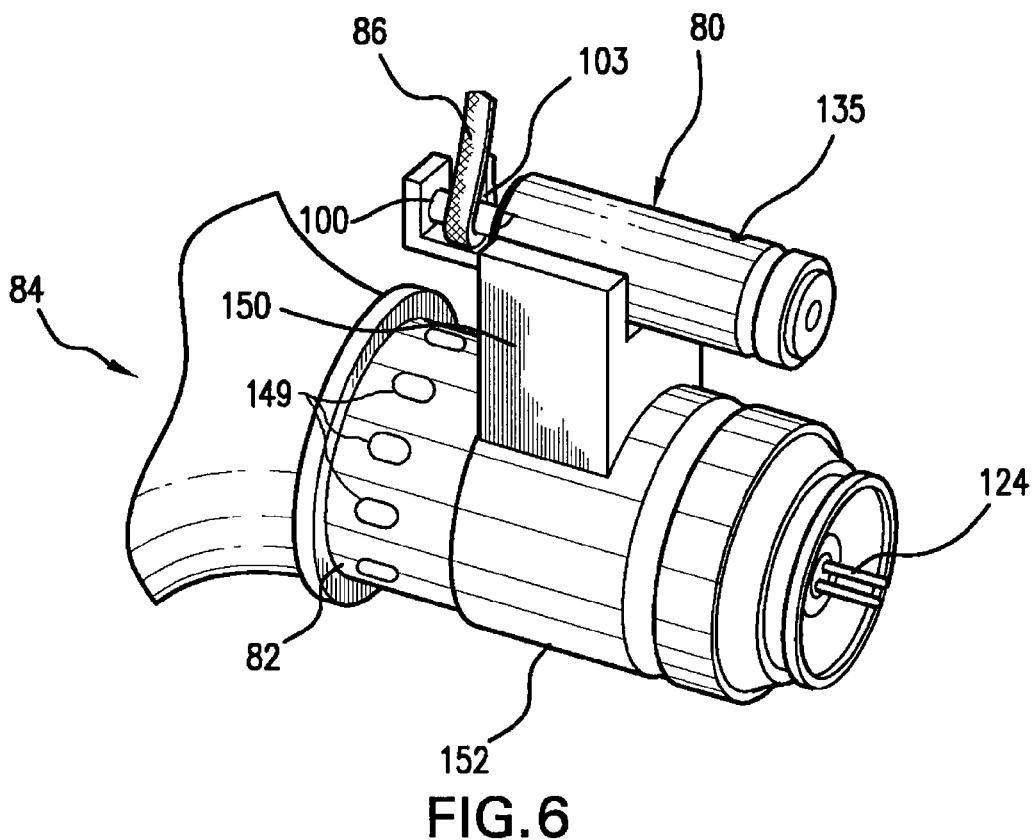
FIG. 6 is a partial perspective view of the inflator device of FIG. 5.

The tether release mechanism 80 is attached to the valve assembly by a tether release mechanism mount 150. As shown in FIG. 6, the mount 150 includes a collar 152 disposed around the valve assembly 82. The mount 150 and/or the collar 152 can be attached and secured to the valve assembly by any means known and available to those skilled in the art. In one particularly preferred embodiment, the collar 152 is attached and secured to the valve assembly 82 by a crimp 154. Referring to FIG. 5, the mount 150 includes a mount passageway 156 therethrough. The mount passageway 156 is aligned with both the valve venting channel 110 and the inlet opening 106, thereby connecting the valve venting channel 110 and the inlet opening 106 in discharge alignment. As will be appreciated by those skilled in the art following the teachings herein provided, various sizes, shapes and configurations are available for the mount, the collar and the mount passageway.

Figure 7:
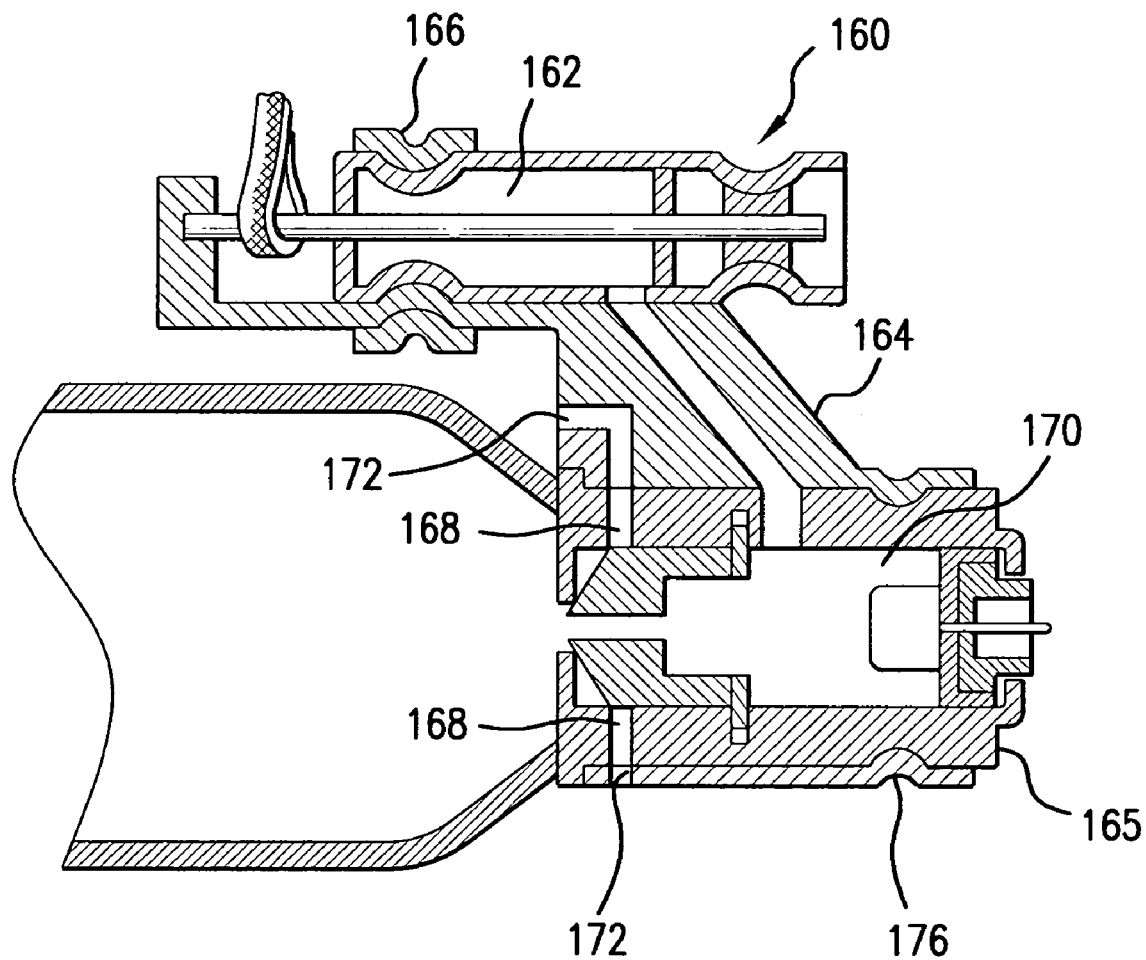
FIG. 7 is a partial and sectional view of an inflator device having a tether release mechanism in combination with a valve assembly, according to yet another embodiment of the invention.

FIG. 7 illustrates another embodiment of a tether release mechanism of the invention. In FIG. 7, the tether release mechanism 160 includes a tether release chamber 162 mounted to a tether release mechanism mount 164 by a crimped ring 166. The mount 164 extends over the radial vent passageways 168 of a valve assembly 165, that, as discussed above, connect the valve passageway 170 to the ambient environment. To allow venting of inflation gas to the ambient environment (before the piston 174 is moved into the closed position shown in FIG. 7), the mount 164 includes a plurality of venting passageways 172, each aligned with and connecting one of the radial vent passageways 168 to the ambient environment. The mount 164 is connected to the valve assembly 165 by a crimp 176.

Thus, the invention provides a venting system having a valve that can be left open to vent inflation gas or closed to direct more inflation gas to the inflatable cushion, thereby providing adaptive inflation gas output. An optional tether release mechanism can be powered by the valve assembly of the venting system. The tether release system can control the size and/or shape of the inflating cushion, thereby providing additional adaptive performance. In the event of a severe collision, for example, the valve can be activated to close, thereby increasing inflation gas output and activating the tether release mechanism to release the tether. By releasing the tether, the inflatable cushion is allowed to inflate to, for example, its full, untethered configuration to provide the desired occupant protection.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In an inflator device for inflating an inflatable cushion of an inflatable cushion restraint system, the inflator device including a supply of gas generant material disposed within a sealed chamber and an initiator device in reaction initiation combination with the supply of gas generant material, the improvement comprising:
    a venting orifice connecting the chamber to an ambient environment;
    a rupturable seal sealing the venting orifice, wherein upon reaction initiation of the gas generant material, the rupturable seal ruptures to vent the chamber to the ambient environment; and
    a valve comprising a valve assembly disposed adjacent the venting orifice, wherein the valve is closable to block venting through the venting orifice upon rupture of the rupturable seal, the valve assembly comprising:
        a valve passageway aligned with the venting orifice;
        a valve piston moveable within the valve passageway; and
        a valve actuator device for moving the valve piston within the valve passageway, wherein upon actuation of the valve actuator, the valve piston moves to at least partially block venting through the venting orifice.

2. The inflator device according to claim 1 additionally comprising a plurality of radial vent passageways radially extending from the valve passageway and connecting the valve passageway to the ambient environment.

3. The inflator device according to claim 1 wherein the valve actuator device comprises a valve initiator device disposed at an end of the valve passageway opposite the venting orifice.

4. The inflator device according to claim 3 additionally comprising a pressure release opening connecting the valve passageway to the ambient environment, wherein in an open position of the valve before actuation of the valve initiator device the valve piston is disposed over the pressure release opening, and upon actuation of the valve initiator device the valve piston moves within the valve passageway and off the pressure release opening, whereby after movement of the valve piston the pressure release opening is disposed between the valve piston and the valve initiator device.

5. The inflator device according to claim 1 wherein the valve assembly additionally comprises a piston locking element disposed partially within an aperture in a wall of the valve passageway, wherein a portion of the piston locking element extending from the aperture is disposed adjacent the valve piston to secure the valve piston in an open position adjacent the valve actuator.

6. The inflator device according to claim 5 wherein upon actuation of the valve actuator, the piston locking element is moveable to allow the valve piston to move within the valve passageway and the piston locking element then secures the valve piston in a closed position adjacent the venting orifice.

7. The inflator device according to claim 6 wherein the piston locking element comprises a snap ring.

8. The inflator device according to claim 1 additionally comprising a tether release mechanism in combination with the valve assembly, wherein the valve actuator device is in actuating combination with the tether release mechanism.

9. The inflator device according to claim 8 wherein the valve actuator device comprises a valve initiator device disposed at an end of the valve passageway opposite the venting orifice, the valve assembly additionally comprises a valve venting channel connecting the valve passageway to the tether release mechanism, and the piston includes an opening therethrough, wherein upon actuation of the valve initiator device, the valve initiator device moves the piston and reaction products pass through the valve venting channel to actuate the tether release mechanism.

10. A method of using the inflator device of claim 1 upon a collision, the method comprising:
    initiating reaction of the supply of gas generant material to produce inflation gas;
    actuating the valve actuator to move the valve piston within the valve passageway; and
    blocking the venting orifice with the valve piston to direct the inflation gas only to the inflatable cushion.

11. An inflator device for inflating an inflatable cushion of an inflatable cushion restraint system, the inflator device comprising:
    a housing at least in part defining a chamber;
    a supply of gas generant material disposed at least partially within the chamber;
    an initiator device in reaction initiation combination with the supply of gas generant material;
    the housing including an outlet orifice in inflation combination with the inflatable cushion;
    the housing including a venting orifice connecting the chamber to an ambient environment;

a rupturable seal sealing each of the outlet orifice and the venting orifice; and a valve assembly disposed adjacent the venting orifice, the valve assembly comprising:

a valve passageway defined by the valve assembly and aligned with the venting orifice, the valve passageway including a plurality of vent passageways radially extending from the valve passageway and connecting the valve passageway to the ambient environment;

a valve piston moveable within the valve passageway; and a valve initiator device disposed at an end of the valve passageway opposite the venting orifice, wherein upon actuation of the valve initiator device, the valve piston moves and at least partially blocks the venting orifice.

12. The inflator device according to claim 11 wherein the valve assembly additionally comprises a snap ring disposed partially within an aperture in a wall of the valve passageway, wherein a portion of the snap ring extending from the aperture is disposed adjacent the valve piston to secure the valve piston in an open position adjacent the valve actuator.

13. The inflator device according to claim 11 additionally comprising a tether release mechanism in combination with the valve assembly, wherein the valve initiator device is in actuating combination with the tether release mechanism.

14. The inflator device according to claim 13 wherein the valve assembly additionally comprises a valve venting channel connecting the valve passageway to the tether release mechanism and the tether release mechanism comprises:

a tether release chamber including an inlet opening in a first chamber side wall and a piston opening in a chamber end wall, the inlet opening in discharge alignment with a valve venting channel of the valve assembly;

a tether piston moveable within the chamber and including a piston rod extending through the piston opening and for retaining a tether connected to the inflatable cushion;

wherein upon actuation of the valve initiator device, reaction products in the valve passageway enter the tether release chamber through the valve venting channel and move the piston toward a second chamber end wall opposite the first chamber end wall, thereby sliding the piston rod to release the tether.

15. The inflator device according to claim 14 additionally comprising a compressible member disposed between the piston and a second chamber end wall opposite the first chamber end wall.

16. The inflator device according to claim 15 additionally comprising a tether release mechanism mount for attaching the tether release mechanism to the valve assembly, the tether release mechanism mount including a passageway extending between the valve venting channel and the inlet opening.

17. An inflator device for inflating an inflatable cushion of an inflatable cushion restraint system, the inflator device comprising:

a housing including a first housing wall and a second housing wall and at least in part defining a chamber;

a supply of gas generant material disposed at least partially within the chamber;

an initiator device in reaction initiation combination with the supply of gas generant material;

an outlet orifice in the first housing wall and in inflation combination with the inflatable cushion;

a venting orifice in the second housing wall connecting the chamber to an ambient environment;

a rupturable seal sealing each of the outlet orifice and the venting orifice;

a valve assembly disposed adjacent the venting orifice, the valve assembly including a valve passageway aligned with the venting orifice, a valve piston moveable within the valve passageway, a valve initiator device disposed at an end of the valve passageway opposite the venting, and a valve venting channel, wherein upon actuation, the valve initiator device produces a reaction product that moves the valve piston to at least partially block the venting orifice; and a tether release mechanism comprising a tether release chamber and a tether piston moveable within the tether release chamber, the tether release chamber including a chamber side wall including an inlet opening in discharge alignment with the valve venting channel and a piston opening in a chamber end wall adjacent the chamber side wall, the tether piston including a piston rod extending through the piston opening for retaining a tether connected to the inflatable cushion.

\* \* \* \* \*